US010296751B2

(12) United States Patent
Boudreau et al.

(10) Patent No.: US 10,296,751 B2
(45) Date of Patent: May 21, 2019

(54) AUTOMATED REAL-TIME INFORMATION MANAGEMENT RISK ASSESSOR

(71) Applicant: INTERNATIONAL BUSINESS MACHINES CORPORATION, Armonk, NY (US)

(72) Inventors: Michael K. Boudreau, Orange, CA (US); Joseph N. Dellatorre, Paeonian Springs, VA (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 15/279,618

(22) Filed: Sep. 29, 2016

(65) Prior Publication Data

US 2018/0089449 A1    Mar. 29, 2018

(51) Int. Cl.
*G06F 7/04* (2006.01)
*G06F 21/62* (2013.01)
*H04L 29/06* (2006.01)

(52) U.S. Cl.
CPC .......... *G06F 21/62* (2013.01); *H04L 63/0428* (2013.01)

(58) Field of Classification Search
CPC .... G06F 21/577; G06F 21/554; G06F 21/561; G06F 2221/2111; H04L 41/28; H04L 2209/60; H04L 67/306
USPC ......................................... 726/4–30; 713/165
See application file for complete search history.

(56) References Cited

U.S. PATENT DOCUMENTS

| 2007/0250903 | A1 | 10/2007 | Furuichi et al. | |
| 2007/0294253 | A1 | 12/2007 | Strub et al. | |
| 2009/0024663 | A1* | 1/2009 | McGovern | G06F 21/577 |
| 2009/0158384 | A1 | 6/2009 | Kanade et al. | |
| 2009/0208142 | A1* | 8/2009 | Treadwell | G06F 17/278 |
| | | | | 382/321 |
| 2009/0260054 | A1 | 10/2009 | Bryce et al. | |
| 2014/0201111 | A1 | 7/2014 | Kasravi et al. | |
| 2014/0279641 | A1* | 9/2014 | Singh | G06Q 50/265 |
| | | | | 705/325 |
| 2015/0205954 | A1* | 7/2015 | Jou | G06F 21/316 |
| | | | | 726/22 |

(Continued)

OTHER PUBLICATIONS

Peter Mell et al, The NIST Definition of Cloud Computing, National Institute of Standards and Technology, Publication 800-145, 2011.

*Primary Examiner* — Farid Homayounmehr
*Assistant Examiner* — Lizbeth Torres-Diaz
(74) *Attorney, Agent, or Firm* — Patrick J. Daugherty; Daugherty & Del Zoppo Co., LPA

(57) ABSTRACT

In response to a request to transmit a message from a sender to a recipient, risk values including low and high values are assigned to a content risk rating via comparing content of the message to content risk criteria, to a sender risk rating as a function of a sender identity, to a recipient risk rating as a function of a recipient identity, and to a dissemination reach rating of the message as a function of association to a security level of a message distribution channel. A total message risk score is determined from the content disclosure risk rating, sender risk rating, recipient risk rating and dissemination reach rating values. The message is transmitted from the sender to the recipient or if the total message risk score meets a high risk threshold value; otherwise, a mitigation action is applied to the message.

20 Claims, 5 Drawing Sheets

(56) References Cited

U.S. PATENT DOCUMENTS

2015/0373044 A1* 12/2015 Stiansen ............. H04L 63/1491
  726/22
2016/0292599 A1* 10/2016 Andrews ............ G06Q 10/0635
2018/0152471 A1* 5/2018 Jakobsson .............. G06Q 50/01

* cited by examiner

AUTOMATED REAL-TIME INFORMATION MANAGEMENT RISK ASSESSOR

BACKGROUND

The availability of digital information over myriad communication channels and devices presents exposure risks to public and private entities, including competitive risk, brand risk, legal risk and security risk. Competitive and security risks refers to the exposure of confidential, proprietary or classified information to competitors or unauthorized persons or governmental entities. Brand risk arises from possibilities of unauthorized release of internal emails, messaging and other documents that may be damaging to the reputation of the entity. Legal risks are presented by the inappropriate handling, storage, archiving and dissemination of messages that may be subject to subsequent preservation requirements associated with litigation or other legal or regulatory activities.

Information management comprehends services that offer protection from inappropriate or unauthorized data releases. Such services may control access to information via firewalls, password methodology, data encryption, trusted operating system (OS) requirements, and also construct and implement policies and practices for handling sensitive information. The efficacy of such approaches may be undermined by a variety of factors, including internal errors, carelessness, or intentional wrongdoing by those who handle high risk information. Privacy policies and frequent employee training are prerequisites of robust information governance programs, however such policies and procedures have proven insufficient in preventing egregious unintended distributions of sensitive information under the prior art.

BRIEF SUMMARY

In one aspect of the present invention, a computerized method for an automated information management risk assessor includes executing steps on a computer processor. Thus, in response to a request to transmit a message from a sender to a recipient via a message distribution channel, a computer processor assigns risk values selected from a group of different risk values that includes low value and high values to a content risk rating of the message as a function of comparing content of the message to content risk criteria, to a sender risk rating of the message as a function of association to an identity of the sender, to a recipient risk rating of the message as a function of association to an identity of the recipient, and to a dissemination reach rating of the message as a function of association to a security level of the message distribution channel. A total message risk score is determined as a function of the values assigned to the content disclosure risk rating, the sender risk rating, the recipient risk rating and the dissemination reach rating. The message is transmitted from the sender to the recipient in response to determining that the total message risk score is less than a high risk threshold value. Otherwise (in response to determining that the total message risk score is equal to or greater than the high risk threshold value), a mitigation action is applied to the message. Mitigation actions include revising the message content prior to sending the message to the recipient, confirming selection of recipient, confirming selection of the message distribution channel, and blocking transmission of the message to the recipient.

In another aspect, a system has a hardware processor in circuit communication with a computer readable memory and a computer-readable storage medium having program instructions stored thereon. The processor executes the program instructions stored on the computer-readable storage medium via the computer readable memory and thereby, in response to a request to transmit a message from a sender to a recipient via a message distribution channel, assigns risk values selected from a group of different risk values that includes low value and high values to a content risk rating of the message as a function of comparing content of the message to content risk criteria, to a sender risk rating of the message as a function of association to an identity of the sender, to a recipient risk rating of the message as a function of association to an identity of the recipient, and to a dissemination reach rating of the message as a function of association to a security level of the message distribution channel. A total message risk score is determined as a function of the values assigned to the content disclosure risk rating, the sender risk rating, the recipient risk rating and the dissemination reach rating. The message is transmitted from the sender to the recipient in response to determining that the total message risk score is less than a high risk threshold value. Otherwise (in response to determining that the total message risk score is equal to or greater than the high risk threshold value), a mitigation is applied to the message. Mitigation actions include revising the message content prior to sending the message to the recipient, confirming selection of recipient, confirming selection of the message distribution channel, and blocking transmission of the message to the recipient.

In another aspect, a computer program product for an automated information management risk assessor has a computer-readable storage medium with computer readable program code embodied therewith. The computer readable hardware medium is not a transitory signal per se. The computer readable program code includes instructions for execution which cause the processor to, in response to a request to transmit a message from a sender to a recipient via a message distribution channel, a computer processor assigns risk values selected from a group of different risk values that includes low value and high values to a content risk rating of the message as a function of comparing content of the message to content risk criteria, to a sender risk rating of the message as a function of association to an identity of the sender, to a recipient risk rating of the message as a function of association to an identity of the recipient, and to a dissemination reach rating of the message as a function of association to a security level of the message distribution channel. A total message risk score is determined as a function of the values assigned to the content disclosure risk rating, the sender risk rating, the recipient risk rating and the dissemination reach rating. The message is transmitted from the sender to the recipient in response to determining that the total message risk score is less than a high risk threshold value. Otherwise (in response to determining that the total message risk score is equal to or greater than the high risk threshold value), a mitigation.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
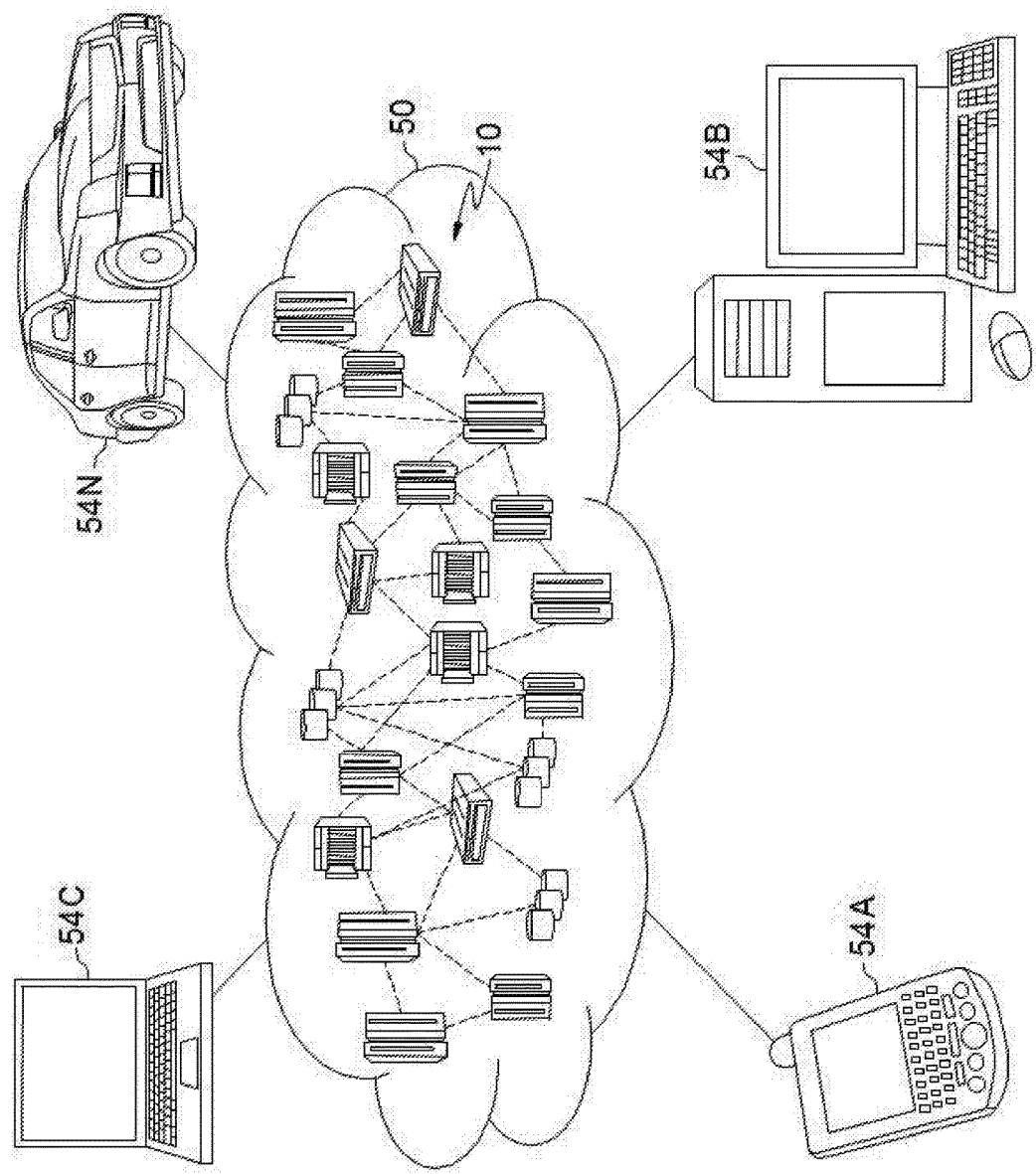
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
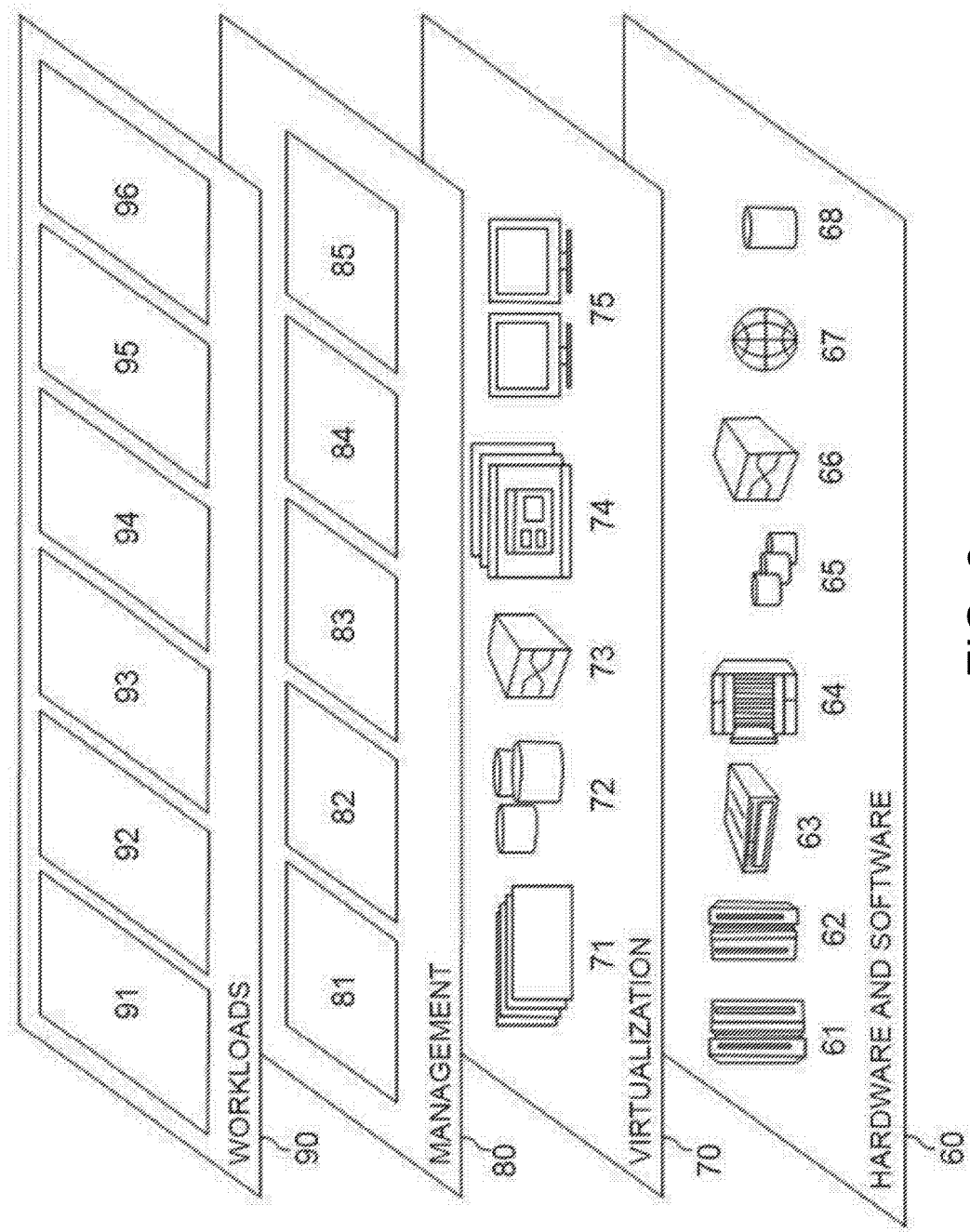
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
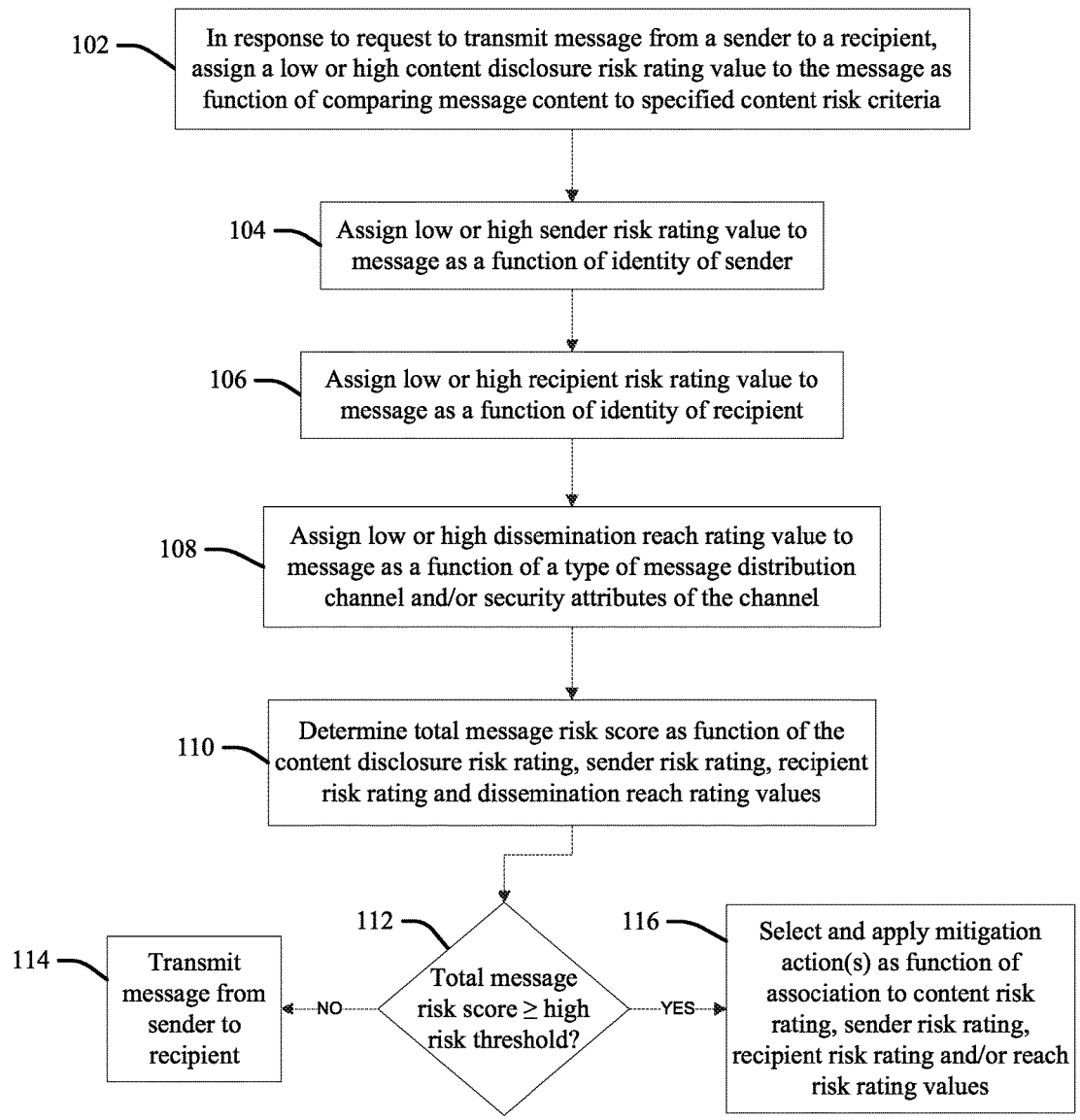
FIG. 4 is a flow chart illustration of a process or system for an automated real-time information management risk assessor according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for an automated real-time information management risk assessor according to embodiments of the present invention, for example to execute the process steps or system components or tasks as depicted in FIG. 4 below.

Figure 3:
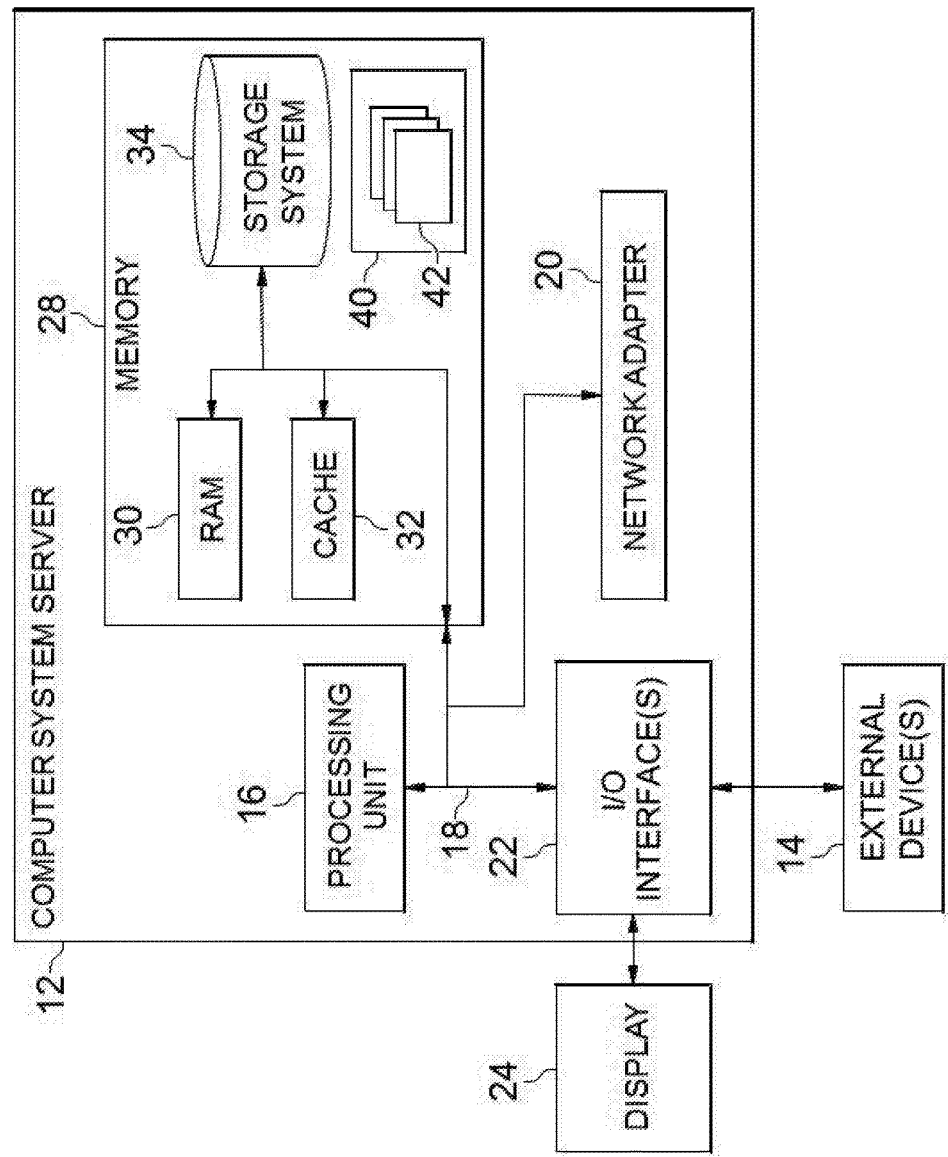
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system according to the present invention for an automated real-time information management risk assessor. In response to a request to transmit a message from a sender to a recipient, at 102 a low content disclosure risk rating value or a high content disclosure risk rating value is assigned to the message as function of comparing the message content to specified content risk criteria. Low or high rating values generally may be selected from a pair of binary choices or values (yes or no, one or zero, etc.), or they may reflect different values within a continuum or set of multiple, other values. The content disclosure risk rating value represents an estimated level or amount of harm that disclosure of the message content would cause the sender, the recipient, or other entity associated with sender or recipient or message transmission (for example, employer, organization of which either is a member; messaging service provider used to transmit the message, etc.) as established by comparison to the specified content risk criteria (for example, sensitivity rules, litigation preservation requirements, entity privacy policies, etc.).

At 104 a low or high sender risk rating value is assigned to the message as a function of an identity of the sender. The sender risk rating reflects an estimated likelihood that disclosure of message content would cause harm to the sender, the recipient, or another entity associated with sender or recipient or transmission of the message, based on the identity of the sender (for example, job title or role of sender within the entity, seniority indicative or likelihood that sender would be in possession of confidential information, likely network visibility base on organizational department including sender, etc.).

At 106 a low or high recipient risk rating value is assigned to the message as a function of an identity of the recipient. The recipient risk rating reflects an estimated likelihood that disclosure of message content would cause harm to the sender, recipient or another entity associated with sender or recipient or transmission of the message, based on the identity of the recipient (job title, role within entity, seniority indicative or likelihood that recipient would receive confidential information from others inclusive of the sender, likely network visibility base on organizational department including recipient, etc.).

At 108 a low or high dissemination reach rating value is assigned to the message as a function of a type of message distribution channel and/or security attributes of the channel. The reach rating value reflects an estimated size of audience, or rate of spread of the message through the estimated audience, that the message may reach if disclosed to another person, someone other than the intended recipient. Type of message distribution channel may distinguish between public and private channels, and security attributes of the channel include strength of password or other user verification processes.

At 110 a total or overall message risk score is determined as a total, average, weighting or other function of the content disclosure risk rating value, the sender risk rating value, the recipient risk rating value and the dissemination reach rating.

At 112 the total message risk score is compared to a high risk threshold. If the total message risk score is below or does not otherwise meet the high risk threshold, the message is transmitted from the sender to the recipient at 114.

Otherwise, if the total message risk score meets or exceeds the high risk threshold, then at 116 one or more mitigation actions are selected from a group of different mitigation actions as a function of association to the content risk rating, sender risk rating, recipient risk rating and/or reach risk rating values or combinations thereof, and applied to the message. More particularly, mitigation actions are selected in response to association with different ones, or different combinations of, the low or high values of the content, sender, recipient and reach risk ratings. Illustrative but not limiting or exhaustive examples of the selected mitigation actions applied at 116 include blocking the message transmission, marking the message as confidential, redacting or encrypting message contents or sender or recipient identities, conditioning transmission of the message upon validation of the sender or recipient, and still other mitigations will be apparent to one skilled in the art.

Figure 5:
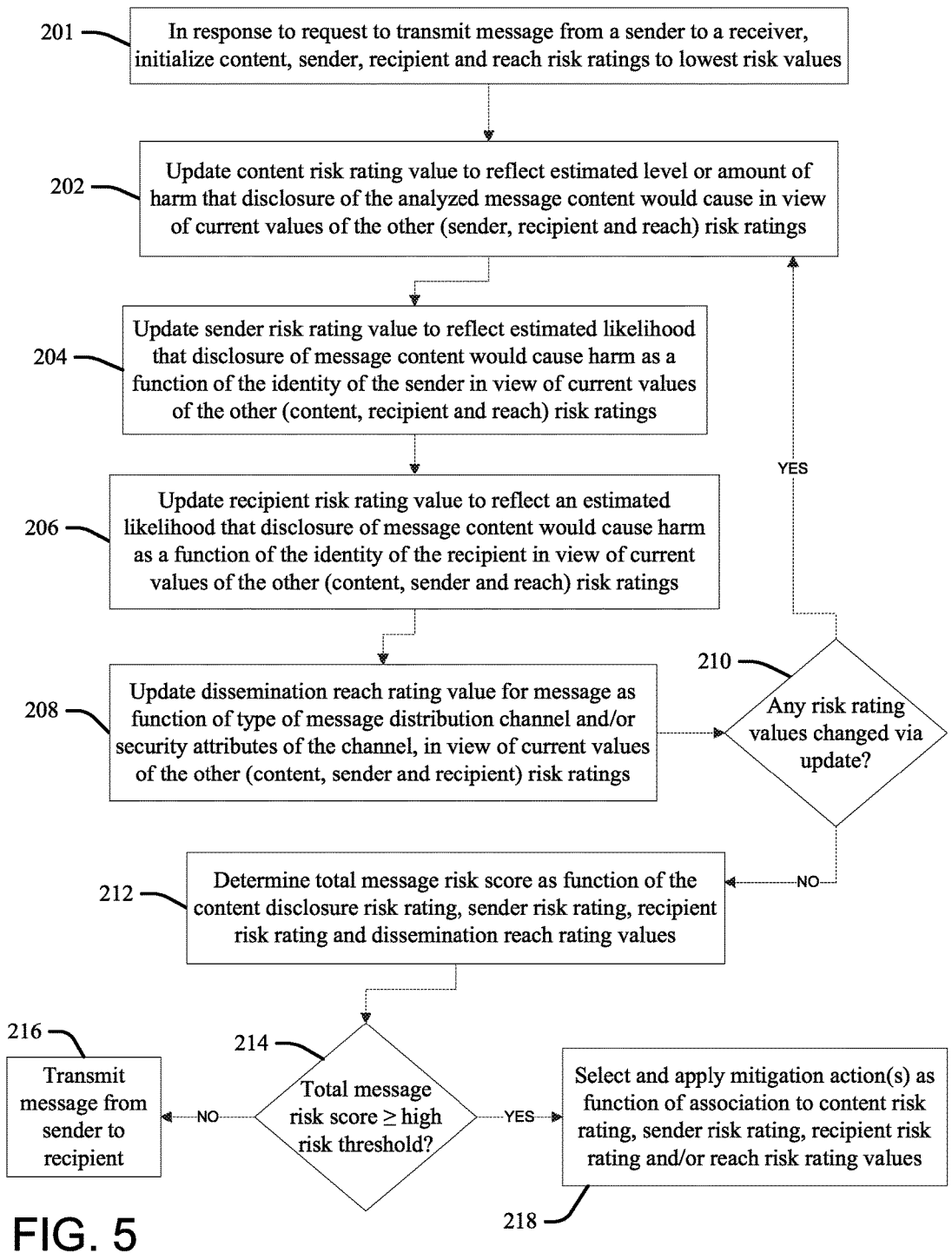
FIG. 5 is a flow chart illustration of a process or system for an automated real-time information management risk assessor according to another embodiment of the present invention.

FIG. 5 illustrates another aspect or embodiment process or system according to the present invention for an automated real-time information management risk assessor that determines various risk rating values as a function of context defined by values of the other risk ratings. Thus, in response to request to transmit message from a sender to a receiver, at 201 a plurality of risk ratings including content, sender, recipient and dissemination reach risk ratings are each initialized to their lowest risk values.

At 202 content of the message is analyzed, and the current content risk rating value is updated (set) to reflect an estimated level or amount of harm that disclosure of the analyzed message content would cause (to the sender, the recipient, or other entity associated with sender or recipient or message transmission) in view of current values of the other (sender, recipient and reach) risk ratings. Thus, the updated message content risk rating value is selected in response to attributes of the message content determined from the content analysis, in view of an overall risk context defined by the other risk rating values.

At 204 the sender risk rating value is updated to reflect an estimated likelihood that disclosure of message content would cause harm as a function of the identity of the sender in view of current values of the other (content, recipient and reach) risk ratings.

At 206 the recipient risk rating value is updated to reflect an estimated likelihood that disclosure of message content would cause harm as a function of the identity of the recipient in view of current values of the other (content, sender and reach) risk ratings.

At 208 the dissemination reach rating value is updated for the message as a function of a type of message distribution channel and/or security attributes of the channel, in view of current values of the other (content, sender and recipient) risk ratings.

At 210, in response to determining that any of the content, sender, recipient and reach risk rating values was revised in response to the updating steps at 202, 204, 206 or 208, the process cycles back to 202. Thus, the decision process at 210 generates a feedback or learning process that iteratively adjusts the respective risk rating values each time the steps at 202, 204, 206 and 208 are repeated, any one of which may adjust respective risk rating values upward or downward in response to changes in the context defined by the changes in values of the other, remaining ones. The iterative process ends when the updating no longer results in a change to any of the different content, sender, recipient and reach risk rating values as determined at 210, wherein at 212 a total or overall message risk score is determine as function of the content disclosure risk rating, sender risk rating, recipient risk rating and dissemination reach rating values (total, average, weighting, etc.).

At 214 the total message risk score is compared to a high risk threshold, and if below or does not otherwise meet the high risk threshold, the message is transmitted from the sender to the recipient at 216. Otherwise, at 218 one or more mitigation actions are selected from a group of different mitigation actions as a function of association to the content risk rating, sender risk rating, recipient risk rating and/or reach risk rating values or combinations thereof, and applied to the message.

Determining content risk rating values may be based on the assessment of content against a set of sensitivity rules, for example specific litigation preservation requirements or a corporate policy defining sensitive personal information and privacy. Content analysis may assess words, phrases and overall context of a message to determine if any portion can be construed as sensitive, proprietary, confidential, or classified. Assessments may be made by comparing words, phrases, and context of the message against various types of criteria including static rules and topically relevant subject matter.

Message content may be compared to static rules that reflect relevant law, policy, or regulations created to govern a message. Policies may define Sensitive Personal Information (SPI) and provide guidance on how the SPI should be handled. Evaluation of the message content may assign an appropriate risk rating (for example, a medium or high risk rating value) in response to finding certain numbers, frequencies or kinds of SPI via scanning the message content. Illustrative but not limiting or exhaustive examples of SPI content include a personal residence or mailing address; a unique, personal governmental identification number, such as taxpayer identification number, a driver's license number, a passport or visa number; financial account information, including bank account numbers, credit card or debit card numbers or other credit information; health records and medical information, including health insurance identification numbers, payment information, health care treatments or diagnoses; date of birth; and unique organization membership numbers or titles.

In some aspects that determine risk rating values as a function of context defined by the values of the other risk ratings the content risk rating is determined as a function of the degree and potential impact of a breach reflected in the dissemination reach risk rating. For example, the content rating value determined from content analysis may be increased to match the current reach risk rating, or it may be averaged with the reach risk rating, or weighted by the reach risk rating, and still other functions will be apparent to one skilled in the art.

Rules engines against which the message content is assessed may be selected in response to determining the nature and context of a user's environment. For example, in response to recognizing that an entity employing the sender or recipient or hosting the message service provider is a healthcare provider, a Health Insurance Portability and Accountability Act (HIPPA) engine is selected and deployed for content analysis, or a Confidential Information Protection and Statistical Efficiency Act of 2002 (CIPSEA) engine is selected in response to a tax accounting service entity.

Evaluation criteria for content comparison based on topically relevant subject matter may be more fluid and dynamic over time relative to static rule comparisons, making a cognitive platform far more effective in keeping pace with ever-expanding bodies of knowledge. For example, an enterprise may choose to designate its research and development (R&D) budget and development programs as sensitive and confidential. This information can be ingested and annotated as another dimension of a content risk assessment. As will be appreciated by one skilled in the art, there are many potential corpora that may be relevant to a particular enterprise or agency, and the above examples are illustrative but not exhaustive examples.

In one (first) example a universal set of selectable content risk rating values ("CR") includes four values. The lowest value, CR=1, signifies low risk content, wherein no sensitive, confidential, or classified information is detected. CR=2 is a medium value, signifying an indeterminate assessment, in some aspects associated with a message mitigation that requires author confirmation or some other additional data from the sender. CR=3 is a high value, indicating that the content contains sensitive, confidential, or classified information as defined by enterprise or agency policy. CR=4 is the highest value, indicating that the message content contains sensitive, confidential, or classified information explicitly governed by law or other government regulation, wherein unauthorized disclosure of the content may subject to penalty.

Sender identity attributes relevant to setting sender risk rating values comprehend multiple qualities or attributes of a creator or sender of a digital communication, wherein each may be associated with a specific risk value for an unintended disclosure of information. For example, a college student "A" sending an email to college student "B" explaining where and when he is planning to have dinner that night will generally present low values for both content and sender risk ratings, in response to determining that students are unlikely to have access to confidential information of the school that they are attending; and further, that such a determination is independent of any content risk rating value of the message, as their activities (including generating messages with controversial content) are unlikely to be attributed to the school entity of concern to the information management risk assessor. Accordingly, the sender risk rating value that is selected for the college student will generally be a low sender risk rating value.

In contrast, if the sender of the email is a very important person (VIP), such as a chief executive officer or a large corporation, then the disclosure of the exact nature (content) of the VIP's whereabouts is generally a very sensitive piece of information and, and both the sender and content risk rating values will be relatively high. In aspects that determine risk rating values as a function of context defined by the values of the other risk ratings, either of the sender or content risk rating, values may be determined as a function of the other (for example, the lower increased to match the rating value of the higher, or either may be set as an average of both, or weighted by the reach risk rating of the other, etc.).

Organizational entity attributes of the sender may be gathered for consideration in setting the sender risk value, including seniority, work location, labor category, years of service, work/project assignments, etc. Attributes of social media activity relevant to the sender may also be gathered from publically available social media sites to form a more complete picture of the sender, such as from topical areas of interest that enable identification of anomalous message content subject matter and associated elevations of unintended disclosure risk.

Continuing discussion of the present (first) example, a universal set of selectable sender risk rating values ("SR") includes four values. The lowest risk value (SR=1) is assigned in response to identifying the sender as a low-risk employee (junior staff member, delivery person, maintenance personal) that has limited organizational footprint activity and a typical, expected (characteristic) social footprint. A moderate risk rating (SR=2) is assigned to senders presenting a moderate risk, such as personnel with access to some sensitive information and/or a more extensive organizational footprint relative to the low risk sender; examples may include subcontractors and external support staff. A high risk rating value (SR=3) is assigned to senior staff with extensive organizational and/or social footprints and that handle a higher amount or level of confidential or sensitive information, or to personnel assigned to a high risk labor category (for example, a database administrator with administrative access rights to sensitive information). A very high risk rating value (SR=4) is assigned to a head of an organization with an extensive organizational and/or social footprint, or to personal having access to the highest amount or level of confidential or sensitive information.

Setting recipient risk rating values comprehends similar attributes and analysis as discussed with respect to setting the sender risk rating values, and further includes "inclusion intention" analysis, wherein aspects determine whether each recipient address included on a message distribution list reflects intentional or purposeful design and action. Some aspects determine if a recipient address was added via accepting a suggestion provided by an "auto-fill" feature embedded in an email software platform, and accordingly assign a medium or high risk rating to reflect a risk of accidental or unintentional inclusion by the sender.

Continuing discussion of the present (first) example, a universal set of selectable recipient risk rating values ("RR") includes four values. The lowest risk value (RR=1) is assigned to recipient having low risk, such as a recognized internal contact within a private entity email system, or to another contact with organizational attributes that match or are similar to those of the sender. A moderate risk value (RR=2) is assigned contacts that are recognized but are external to the enterprise or agency. A high risk value (RR=3) is assigned to recipient that are unrecognized and external to the entity of the sender or message service. A very high risk (RR=4) is assigned to unrecognized, external contact that also have social media activity attributes that indicate a likely security risk, for example associations with competitors or other entities that have interests adverse to the interest of the entity of the sender or messaging service.

Dissemination reach risk rating values reflect projections of how far and how quickly a message is likely to travel given its distribution channel and native security. The reach rating value may be determined in response to an evaluation of position on a continuum of public-vs-private communications, with more public positions giving higher risk values. For example, an open posting on a social media platform that is available for the entire world to see is a highly public forum, relative to an encrypted email sent on a secure isolated network, a private forum that is much less visible to others and correspondingly projected to have a much smaller distribution or reach.

Continuing discussion of the present (first) example, a universal set of selectable reach factor or risk rating values ("RF") includes four values. The lowest reach risk value (RF=1) is assigned to messages that are highly private and secure (featuring encryption, network isolation, etc.). A medium reach risk value (RF=2) is assigned to messages on a private platform with optional encryption. A high risk reach risk value (RF=3) is assigned to messages sent on or posted to public platforms, such as those using third-party email services or posted to third party shared drives. A highest risk value (RF=4) is assigned to postings and messages to social media sites, publically accessible wiki and blogs and bulletin boards, forums that have no or limited content protection.

Continuing discussion of the present (first) example, a total risk score ("TRS") is determined as a function of combining or averaging, including via differential weightings, the content, sender, recipient and reach risk values. The total risk score serves the purpose of standardizing the conditions of the review thereby enabling a predictable "base" response to any given circumstance.

In the present example the total risk scores derived from the content sender, recipient and reach risk values described above are selected from low (TRS=Low, or 1), medium or moderate (TRS=Moderate, or 2), high (TRS=High, or 3) and very high risk (TRS=Very High, or 4) values. The TRS score values may be selected by correlation to totals of the four scores, for example, assigning TRS=Low if $(CR+SR+RR+RF) \leq 4$, TRS=Moderate if $(4<(CR+SR+RR+RF) \leq 8)$; TRS=High if $(8<(CR+SR+RR+RF) \leq 12)$; and TRS=Very High if $((CR+SR+RR+RF) \geq 13)$. The TRS value may also be an average of the content sender, recipient and reach risk values, rounding down or up to a nearest whole value associated with the assigned TRS score; and still other functions will be apparent to one skilled in the art.

Mitigation responses may be automatically executed, or they may be suggested for implementation by the sender or another monitoring entity. For example, words or phrases within a body of a message that are determined or recognized to be of high likely exposure risk (unique usernames, passwords, personal identification numbers, security numbers, personal contact information, dates of birth, etc.) may be highlighted in a dialog box or other presentation displayed to the sender or other monitoring entity for consideration for revision prior to sending the message as originally requested. Highlighted content may be categorized and labelled to identify a nature of the exposure risk, for example watermarked or otherwise labeled "SPI" or "Potentially Confidential," thereby informing the sender or other monitoring entity of a nature of a presented disclosure risk. The highlighted content may also be associated with or replaced with a mitigation recommendation to reduce or eliminate the risks of unintended disclosure, such as partially redacting the information (for example, replacing some numbers with other characters or symbols, thus "XXX-XX-1234"), or removing the information of concern entirely and replacing with a notice ("Available as Needed").

Aspects that determine the various risk rating values as a function of context defined by values of the other risk ratings, including the aspect of FIG. 5, may consider the total risk score in context of (in parallel with) the individual content sender, recipient and reach risk values in selecting and deploying appropriate or optimal risk mitigation responses. For example, in the case of a high risk total risk score (TRS=High) determined from a low risk value for content (CR=1), aspects responsively select and apply mitigation efforts directed to verifying appropriate distribution list addresses and using appropriately secure distribution channels (password protected, private network, etc.), without requiring redaction, encryption or other content-specific mitigations, since the content is low-risk. For example, the TRS=High from CR=1 may be due to a senior official in a government agency sending an internal, agency-only message that comprises publicly known and available information (for example, noting an office closure over a public holiday) but that mistakenly includes a vendor email address in the distribution list; the selected and applied mitigation identifies the vendor email as an external address results and requires that the sender remove the address prior to transmission (for example, labels it as "External Recipient" and states "Remove this address from the distribution list"), but wherein the message content is not highlighted, redacted or otherwise altered.

Illustrative but not limiting or exhaustive examples of mitigation measures include adding labels (for example, "CONFIDENTIAL" or "Do Not Forward") to a message subject line, or as embedded watermarks within the body of the message; attaching standardized terms and conditions to the body of the message (for example, "This transmission contains confidential information intended only for the addressee(s) . . . . If you are not the intended recipient, any use, dissemination, distribution or copying of this document or its contents is strictly prohibited."), and saving and sending attachments in alternative secure file formats (for example, as an encrypted PDF file that requires a key or password to open). More specific examples include:

(i) In response to CR=3, SR=1, RR=1 and RF=2, which indicates that message content presents the only high risk value, automatically marking the message "Confidential."

(ii) In response to CR=4, SR=4, RR=1 and RF=3, selecting mitigation appropriate to the very high risk values present by the message content and the sender, such as requiring the sender to "consider redaction &/or encryption," and blocking transmission of the message until the sender reduces exposure from the high content risk by selecting and implementing one of said options.

(iii) In response to CR=1, SR=4, RR=4 and RF=4, selecting mitigation that limits distribution in response to the very high risk values present by the sender, recipient and reach values, but that is content neutral in response to the low risk rating of the content, such as requiring the sender to "validate distribution list" prior to sending the content as originally proposed.

(iv) In response to CR=4, SR=4, RR=4 and RF=4, wherein all of the relevant risk values indicate high risk values, blocking the message transmission entirely, optimally also informing the sender ("DO NOT SEND AS IS," or "MESSAGE CONTENT NOT APPROVED FOR REQUESTED DISTRIBUTION LIST OR SELECTED MESSAGE SERVICE").

Thus, aspects of the present invention select and apply mitigation measures in response to both individual risk ratings and to the context they present in comparison to each other in generating total risk scoring. Aspects are cognitive in nature, learning optimized risk scores via iterations over time, and wherein aspects may learn and anticipate appropriate mitigations over time as a function of historic data. For example, as each individual sender within an enterprise builds up a "legacy" of messages with various content and distribution patterns, aspects may incorporate the analysis of those patterns into assessment of future communications disclosure risks indicated by the individual and total risk values. Aspects may learn specific regulatory and policy requirements associated with any given sender, recipient or associated entity or service provider by ingesting relevant sensitivity rules, information handling policies and examples from historical records of message that previously met or failed security risk conditions and mitigation requirements.

In another example, a junior associate in a marketing department at XYZ Technology Corporation attempts to send an email with content regarding the hire of five new staff members to a director of Product Marketing and to a project manager of a strategic market growth campaign, the "XYZ Strategic Growth Campaign" or "Growth Campaign." The junior associate has been an employee of XYZ Technology Corporation for four years, and is assigned to the Growth Campaign. The director has been an employee for 24 years and is the executive sponsor of the Growth Campaign. The project manager is a consultant hired to lead the Growth Campaign.

The message content comprises the following: "Good news. All five recruits have accepted our offers and will be on-boarded late next week. I wanted to make you aware that Alex Wagner, Conrad Allison, Nancy Ma, and Peter Smith all accepted the original offer of $80,000. However, Michele Benton renegotiated her salary up to $88,000. Hopefully this does not affect the program's business case too much."

Natural Language Processing determines that the message content includes associations of full names with salary information, and such information is considered sensitive personal information in XYZ Technology's data handling policy for message content. Accordingly, an aspect of the present invention determines that the message content is high risk content, CR=3.

Sender Risk Rating: the junior associate is an employee with a small organizational footprint and limited access to sensitive information, and accordingly assigned a moderate risk rating, SR=2.

Recipient Risk Rating: The director is an employee aligned with the message subject matter, and therefore assigned a low or moderate risk rating. However, the project manager has an external email address: therefore, in view of the high content risk rating, the project manager is correspondingly assigned a high risk rating (3), and the highest risk rating of the two recipients is used to define the recipient risk rating for the message, RR=3.

Reach Factor: while the message is unencrypted, it has no attachments and is being sent over a secure corporate email platform, resulting in a moderate risk value, RF=2.

Total Risk Score: In response to the high risk content rating (CR=3) determined from the presence of the corporate SPI, and to the high risk reach rating (RR=3) determined from the external email account destination; the present aspect determines the total risk score as high risk (TRS=High), for example in response to having at least two of the content, sender, recipient and reach risk rating having high risk values. Mitigation Measures selected and applied include highlighting the full, proper names and labelling them as "Corporate SPI" and suggesting or requiring partial redaction of the names; highlighting the salaries and labelling them as "Corporate SPI" and suggesting or requiring complete removal of the salary information; and highlighting the external email address, labelling it as an "External Address," and recommending confirmation of the email address of the external recipient.

Aspects of the present invention expand the scope of record risk assessment to include the context and meaning of an entire record, rather than merely executing a simple check for specific high risk key words within a record. Aspects evaluate not only the risk rating of the content, but also consider the content risk within a context defined by the additive effects of sender profile, recipient profile, and reach factor data. Aspects may evaluate both structured and unstructured data, and thereby learn and adapt to an ever expanding corpus of information and best practices.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   in response to a request to transmit a message from a sender to a recipient via a message distribution channel, assigning to a content risk rating attribute of a message object defined for the message a low content integer value in response to determining that a content of the message does not comprise confidential information, and a high content integer value in response to determining that the message content comprises the confidential information, wherein the high content integer value is higher than the low content integer value;
   assigning to a sender risk rating attribute of the message object a low sender integer value in response to determining that the sender does not have administrative access rights to sensitive information within an organization entity of the sender, and a high sender integer value in response to determining that the sender has administrative access rights to the sensitive information, wherein the high sender integer value is higher than the low sender integer value;
   assigning to a recipient risk rating attribute of the message object a low recipient integer value in response to recognizing the recipient is an internal contact within the organization entity, and a high recipient integer value to the recipient risk rating attribute in response to determining that the recipient is unrecognized and external to the organization entity, wherein the high recipient integer value is higher than the low recipient integer value;
   assigning to a dissemination reach attribute of the message object a low dissemination integer value in response to determining that the message distribution channel is a private encrypted platform, and a high dissemination integer value in response to determining that the message distribution channel is a public platform or an unencrypted platform, wherein the high dissemination integer value is higher than the low dissemination integer value;
   determining a total message risk score as a combination or average of the values assigned to the content risk rating attribute, the sender risk rating attribute, the recipient risk rating attribute and the dissemination reach rating attribute;
   in response to determining that the total message risk score is less than a high risk threshold value, transmitting the message from the sender to the recipient; and
   in response to determining that the total message risk score is equal to or greater than the high risk threshold value, selecting from a plurality of different mitigation actions and automatically applying to the message a mitigation action that is associated to a specific combination of values of the total risk score, the content risk rating attribute, the sender risk rating attribute, the recipient risk rating attribute and the dissemination reach rating attribute; and
   wherein each of the plurality of different mitigation actions is associated to a different specific combination of values of the total risk score, the content risk rating attribute, the sender risk rating attribute, the recipient risk rating attribute and the dissemination reach rating attribute; and
   wherein the plurality of different mitigation actions comprise revising the message content prior to sending the message to the recipient, confirming selection of one of the recipient and the message distribution channel prior to sending the message to the recipient, and blocking transmission of the message to the recipient.

2. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer readable storage medium via the computer readable memory and thereby performs the assigning integer values to the content risk rating attribute, the sender risk rating attribute, the recipient risk rating attribute and the dissemination reach attribute, the determining the total message risk score, the transmitting the message from the sender to the recipient, and the selecting and automatically applying the mitigation action associated to the specific combination of values of the total risk score, the content risk rating attribute, the sender risk rating attribute, the recipient risk rating attribute and the dissemination reach rating attribute.

3. The method of claim 2, wherein the computer-readable program code is provided as a service in a cloud environment.

4. The method of claim 1, further comprising:
selecting the mitigation action as a first mitigation action that comprises verifying an address of the recipient and requiring use of a private message distribution channel without requiring redaction or encryption of the message content, in response to an association of the first mitigation action to a combination of the total risk score value with the low sender integer value assigned to the message object sender risk rating attribute.

5. The method of claim 1, wherein the plurality of mitigation actions comprise marking the message as confidential, redacting a portion of the message content, encrypting the message content, encrypting an identity of the sender, encrypting an identity of the recipient, conditioning transmission of the message upon validation of one of the sender and the recipient, and confirming selection by the sender of one of the recipient and the message distribution channel prior to sending the message to the recipient.

6. The method of claim 1, further comprising:
selecting the mitigation action as a third mitigation action that comprises marking the message "Confidential," in response to an association of the third mitigation action to a combination of the high content integer value assigned to the content risk rating attribute with the low sender integer value assigned to the sender risk rating attribute, the low recipient integer value assigned to the recipient risk rating attribute and the low dissemination integer value assigned to the dissemination reach attribute.

7. The method of claim 1, further comprising:
selecting the mitigation action as a fourth mitigation action that comprises blocking transmission of the message unless the message content is encrypted or redacted, in response to an association of the fourth mitigation action to a combination of the high content integer value assigned to the content risk rating attribute with the high sender integer value assigned to the sender risk rating attribute, the low recipient integer value assigned to the recipient risk rating attribute and the high dissemination integer value assigned to the dissemination reach attribute.

8. The method of claim 1, further comprising:
selecting the mitigation action as a fifth mitigation action that comprises requiring the sender to validate distribution list of the message prior to sending the message content, in response to an association of the fifth mitigation action to a combination of the low content integer value assigned to the content risk rating attribute with the high sender integer value assigned to the sender risk rating attribute, the high recipient integer value assigned to the recipient risk rating attribute and the high dissemination integer value assigned to the dissemination reach attribute.

9. A system, comprising:
a processor;
a computer readable memory in circuit communication with the processor; and
a computer readable storage medium in circuit communication with the processor;

wherein the processor executes program instructions stored on the computer-readable storage medium via the computer readable memory and thereby:
in response to a request to transmit a message from a sender to a recipient via a message distribution channel, assigns to a content risk rating attribute of a message object defined for the message a low content integer value in response to determining that a content of the message content does not comprise confidential information, and a high content integer value in response to determining that the message content comprises the confidential information, wherein the high content integer value is higher than the low content integer value;
assigns to a sender risk rating attribute of the message object a low sender integer value in response to determining that the sender does not have administrative access rights to sensitive information within an organization entity of the sender, and a high sender integer value in response to determining that the sender has administrative access rights to the sensitive information, wherein the high sender integer value is higher than the low sender integer value;
assigns to a recipient risk rating attribute of the message object a low recipient integer value in response to recognizing the recipient is an internal contact within the organization entity, and a high recipient integer value to the recipient risk rating attribute in response to determining that the recipient is unrecognized and external to the organization entity, wherein the high recipient integer value is higher than the low recipient integer value;
assigns to a dissemination reach attribute value of the message object a low dissemination integer value in response to determining that the message distribution channel is a private encrypted platform, and a high dissemination integer value in response to determining that the message distribution channel is a public platform or an unencrypted platform, wherein the high dissemination integer value is higher than the low dissemination integer value;
determines a total message risk score as a combination or average of the values assigned to the content risk rating attribute, the sender risk rating attribute, the recipient risk rating attribute and the dissemination reach rating attribute;
in response to determining that the total message risk score is less than a high risk threshold value, transmits the message from the sender to the recipient; and
in response to determining that the total message risk score is equal to or greater than the high risk threshold value, selects from a plurality of different mitigation actions and automatically applies to the message a mitigation action that is associated to a specific combination of values of the total risk score, the content risk rating attribute, the sender risk rating attribute, the recipient risk rating attribute and the dissemination reach rating attribute; and
wherein each of the plurality of different mitigation actions is associated to a different specific combination of values of the total risk score, the content risk rating attribute, the sender risk rating attribute, the recipient risk rating attribute and the dissemination reach rating attribute; and
wherein the plurality of different mitigation actions comprise revising the message content prior to sending the message to the recipient, confirming selection of one of the recipient and the message distribution channel prior to sending the message to the recipient, and blocking transmission of the message to the recipient.

10. The system of claim 9, wherein the processor executes the program instructions stored on the computer-readable storage medium via the computer readable memory and thereby: selecting the mitigation action as a first mitigation action that comprises verifying an address of the recipient and requiring use of a private message distribution channel without requiring redaction or encryption of the message content, in response to an association of the first mitigation action to a combination of the total risk score value with the low sender integer value assigned to the message object sender risk rating attribute.

11. The system of claim 9, wherein the plurality of mitigation actions comprise blocking transmission of the message to the recipient, marking the message as confidential, redacting a portion of the message content, encrypting the message content, encrypting an identity of the sender, encrypting an identity of the recipient, conditioning transmission of the message upon validation of one of the sender and the recipient, and confirming selection by the sender of one of the recipient and the message distribution channel prior to sending the message to the recipient.

12. The system of claim 9, wherein the processor executes the program instructions stored on the computer-readable storage medium via the computer readable memory and thereby:
selects the mitigation action as a third mitigation action that comprises marking the message "Confidential," in response to an association of the third mitigation action to a combination of the high content integer value assigned to the content risk rating attribute with the low sender integer value assigned to the sender risk rating attribute, the low recipient integer value assigned to the recipient risk rating attribute and the low dissemination integer value assigned to the dissemination reach attribute.

13. The system of claim 9, wherein the processor executes the program instructions stored on the computer-readable storage medium via the computer readable memory and thereby:
selects the mitigation action as a fourth mitigation action that comprises blocking transmission of the message unless the message content is encrypted or redacted, in response to an association of the fourth mitigation action to a combination of the high content integer value assigned to the content risk rating attribute with the high sender integer value assigned to the sender risk rating attribute, the low recipient integer value assigned to the recipient risk rating attribute and the high dissemination integer value assigned to the dissemination reach attribute.

14. The system of claim 9, wherein the processor executes the program instructions stored on the computer-readable storage medium via the computer readable memory and thereby:
selects the mitigation action as a fifth mitigation action that comprises requiring the sender to validate distribution list of the message prior to sending the message content, in response to an association of the fifth mitigation action to a combination of the low content integer value assigned to the content risk rating attribute with the high sender integer value assigned to the sender risk rating attribute, the high recipient integer value assigned to the recipient risk rating attribute and the high dissemination integer value assigned to the dissemination reach attribute.

15. A computer program product, comprising:
a computer readable storage medium having computer readable program code embodied therewith, wherein the computer readable storage medium is not a transitory signal per se, the computer readable program code comprising instructions for execution by a processor that cause the processor to:
in response to a request to transmit a message from a sender to a recipient via a message distribution channel, assign to a content risk rating attribute of a message object defined for the message a low content integer value in response to determining that a content of the message does not comprise confidential information, and a high content integer value in response to determining that the message content comprises the confidential information, wherein the high content integer value is higher than the low content integer value;
assign to a sender risk rating attribute of the message object a low sender integer value in response to determining that the sender does not have administrative access rights to sensitive information within an organization entity of the sender, and a high sender integer value in response to determining that the sender has administrative access rights to the sensitive information, wherein the high sender integer value is higher than the low sender integer value;
assign to a recipient risk rating attribute of the message object a low recipient integer value in response to recognizing the recipient is an internal contact within the organization entity, and a high recipient integer value to the recipient risk rating attribute in response to determining that the recipient is unrecognized and external to the organization entity, wherein the high recipient integer value is higher than the low recipient integer value;
assign to a dissemination reach attribute value of the message object a low dissemination integer value in response to determining that the message distribution channel is a private encrypted platform, and a high dissemination integer value in response to determining that the message distribution channel is a public platform or an unencrypted platform, wherein the high dissemination integer value is higher than the low dissemination integer value;
determine a total message risk score as a combination or average of the values assigned to the content risk rating attribute, the sender risk rating attribute, the recipient risk rating attribute and the dissemination reach rating attribute;
in response to determining that the total message risk score is less than a high risk threshold value, transmit the message from the sender to the recipient; and
in response to determining that the total message risk score is equal to or greater than the high risk threshold value, select from a plurality of different mitigation actions and automatically applies to the message a mitigation action that is associated to a specific combination of values of the total risk score, the content risk rating attribute, the sender risk rating attribute, the recipient risk rating attribute and the dissemination reach rating attribute; and
wherein each of the plurality of different mitigation actions is associated to a different specific combination of values of the total risk score, the content risk rating attribute, the sender risk rating attribute, the recipient risk rating attribute and the dissemination reach rating attribute; and wherein the plurality of different mitigation actions comprise revising the message content prior to sending the message to the recipient, confirming selection of one of the recipient and the message distribution channel prior to sending the message to the recipient, and blocking transmission of the message to the recipient.

16. The computer program product of claim 15, wherein the computer readable program code instructions for execution by the processor further cause the processor to:

select the mitigation action as a first mitigation action that comprises verifying an address of the recipient and requiring use of a private message distribution channel without requiring redaction or encryption of the message content, in response to an association of the first mitigation action to a combination of the total risk score value with the low sender integer value assigned to the message object sender risk rating attribute.

17. The computer program product of claim 15, wherein the plurality of mitigation actions comprise marking the message as confidential, redacting a portion of the message content, encrypting the message content, encrypting an identity of the sender, encrypting an identity of the recipient, conditioning transmission of the message upon validation of one of the sender and the recipient, and confirming selection by the sender of one of the recipient and the message distribution channel prior to sending the message to the recipient.

18. The computer program product of claim 15, wherein the computer readable program code instructions for execution by the processor further cause the processor to:

select the mitigation action as a third mitigation action that comprises marking the message "Confidential," in response to an association of the third mitigation action to a combination of the high content integer value assigned to the content risk rating attribute with the low sender integer value assigned to the sender risk rating attribute, the low recipient integer value assigned to the recipient risk rating attribute and the low dissemination integer value assigned to the dissemination reach attribute.

19. The computer program product of claim 15, wherein the computer readable program code instructions for execution by the processor further cause the processor to:

select the mitigation action as a fourth mitigation action that comprises blocking transmission of the message unless the message content is encrypted or redacted, in response to an association of the fourth mitigation action to a combination of the high content integer value assigned to the content risk rating attribute with the high sender integer value assigned to the sender risk rating attribute, the low recipient integer value assigned to the recipient risk rating attribute and the high dissemination integer value assigned to the dissemination reach attribute.

20. The computer program product of claim 15, wherein the computer readable program code instructions for execution by the processor further cause the processor to:

select the mitigation action as a fifth mitigation action that comprises requiring the sender to validate distribution list of the message prior to sending the message content, in response to an association of the fifth mitigation action to a combination of the low content integer value assigned to the content risk rating attribute with the high sender integer value assigned to the sender risk rating attribute, the high recipient integer value assigned to the recipient risk rating attribute and the high dissemination integer value assigned to the dissemination reach attribute.

\* \* \* \* \*